Feb. 14, 1961  R. EICHENBERG ET AL  2,971,527
AUTOMATIC PLASTIC SEALED VALVES
Filed Aug. 29, 1955  2 Sheets-Sheet 1
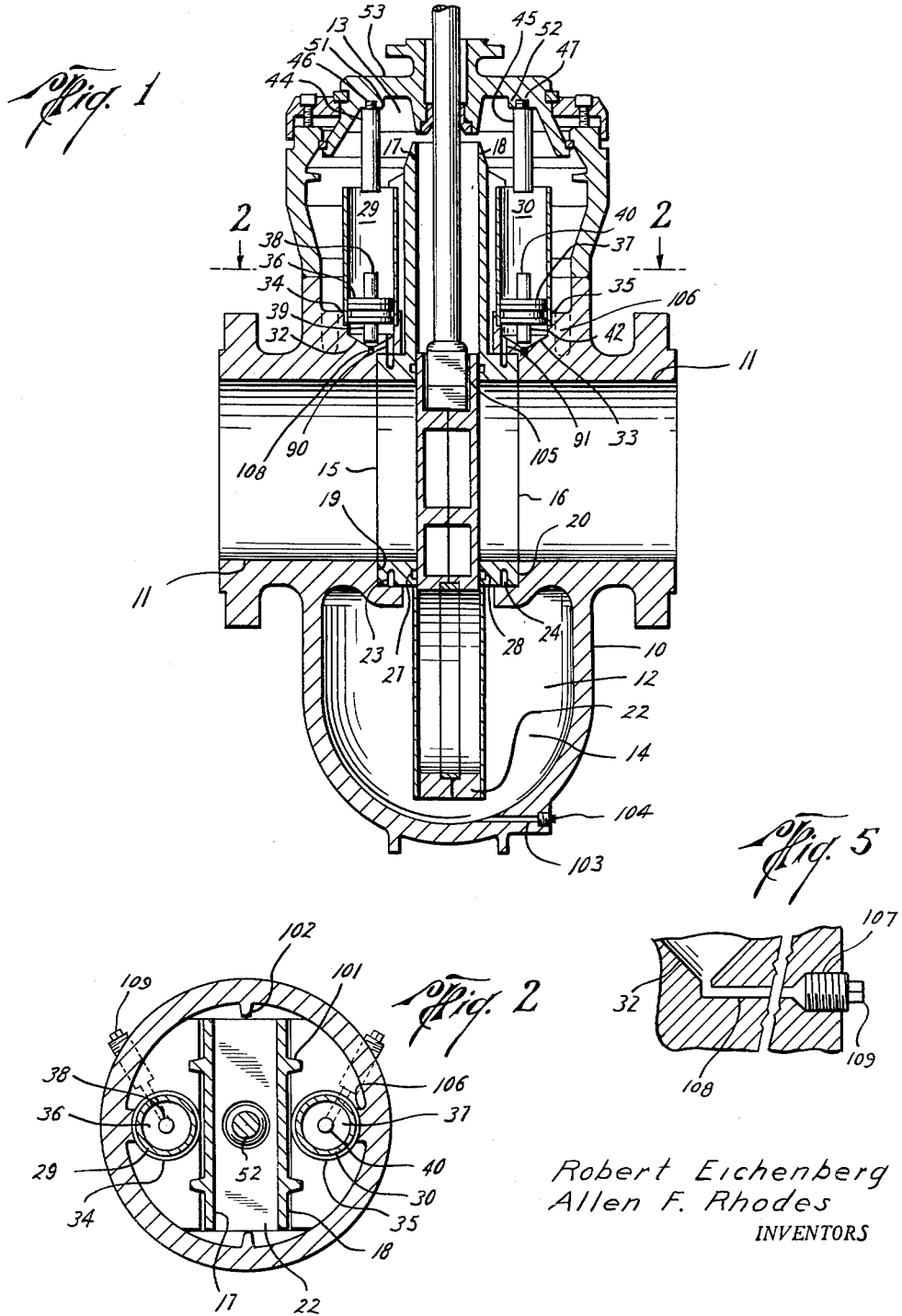
Robert Eichenberg
Allen F. Rhodes
INVENTORS

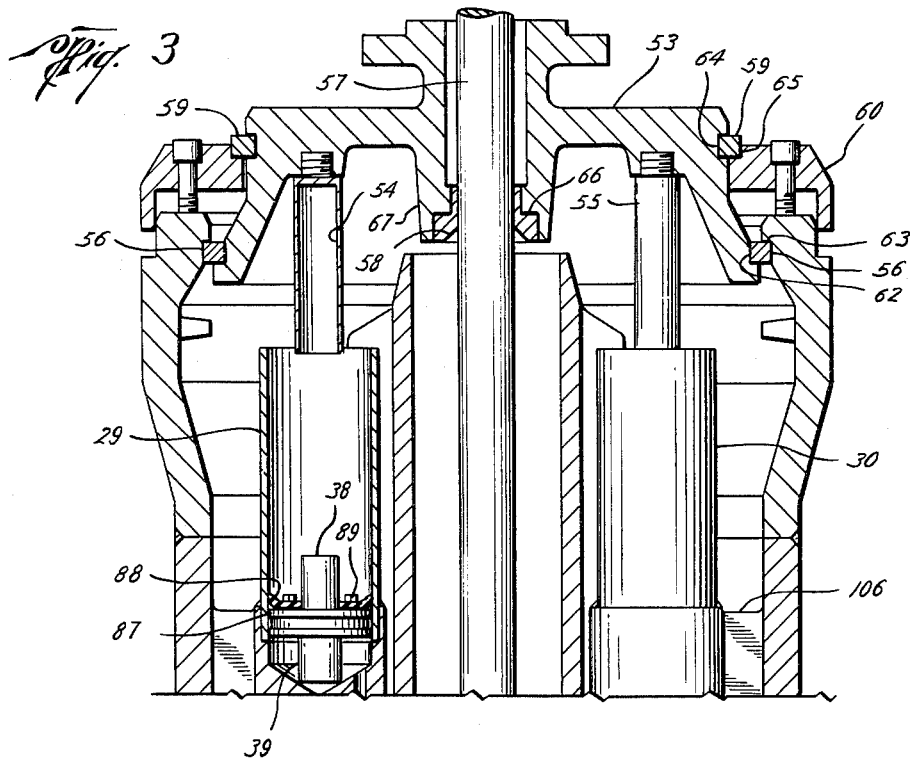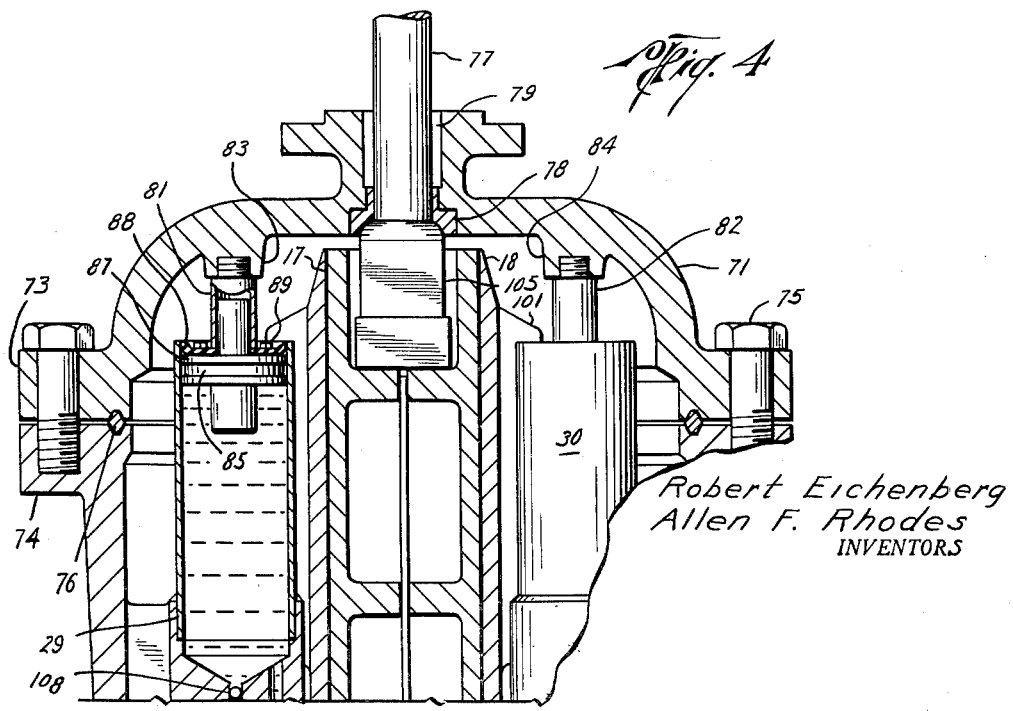

United States Patent Office 2,971,527
Patented Feb. 14, 1961

2,971,527

AUTOMATIC PLASTIC SEALED VALVES

Robert Eichenberg and Allen F. Rhodes, Houston, Tex., assignors, by mesne assignments, to McEvoy Company, Houston, Tex., a corporation of Texas Filed Aug. 29, 1955, Ser. No. 531,187

4 Claims. (Cl. 137—246.12)

This invention pertains to automatic plastic sealed valves, especially large conduit gate valves.

It is an object of the invention to provide a sealing material reservoir of maximum capacity.

Another object of the invention is to provide a sealing material reservoir which is readily replaceable.

A further object of this invention is to provide a sealing material automatic feed reservoir for such valves which can be more easily manufactured and maintained and repaired.

A further object of this invention is to provide means to limit the travel of the piston in the reservoir to prevent loss of the piston and to prevent binding of the piston in the bottom of the reservoir when the reservoir becomes empty.

A further object of the invention is to provide a piston for the reservoir that will seal better and be less apt to bind.

Another object of the invention is to provide piston seal means that will release on excess reservoir pressure when the differential pressure on the piston is directed outwardly.

Other objects and advantages of the invention will appear from the following description of a preferred embodiment thereof and several modifications, reference being had to the accompanying drawings wherein:

Figure 1 is a vertical section through a valve embodying the invention;

Figure 2 is a horizontal section taken on line 2—2 of Figure 1;

Figure 3 is a vertical section similar to Figure 1 showing only a portion of the valve and illustrating a modification; and Figure 4 is a vertical section through a different type of valve embodying the invention, showing only a portion of the valve.

Figure 5 is a partial vertical cross-sectional view of a sealant injection port and passage.

Referring now to the drawings in detail, Figures 1–3 show a preferred embodiment of the invention. The valve has a main body or casing 10 formed with a transverse fluid passage 11 running therethrough. The casing also has a central chamber 12 intercepting the passage 11. The valve gate 22 operates in central chamber 12 between an upper chamber portion 13 and a lower chamber portion 14, both of which form extensions of central chamber 12. A pair of valve seats 15 and 16 having flush seat extensions 17 and 18 are disposed in recesses 19 and 20 respectively, which are provided at the sides of chamber 12 and around the sides of fluid passage 11. The valve seats 15 and 16, besides serving as seats and guides for gate 22, have peripheral passages 23 and 24 and suitable transverse passages (not shown) through which a lubricating and sealing plastic is delivered to grooves 27 and 28 at the faces of seats 15 and 16. In upper chamber 13 at either side of seat extensions 15 and 16, reservoirs 29 and 30 are disposed in recesses 32 and 33 which are formed in raised block members 34 and 35, usually located at the bottom of chamber 13 adjacent the tops of seats 15 and 16 as shown. Passages 90 and 91 extend downwardly from recesses 32 and 33, which form the bottoms of reservoirs 29 and 30. The bottom ends of passages 90 and 91 engage grooves 23 and 24 in the valve seats so that plastic can flow into those passages from the reservoirs. The walls of reservoirs 29 and 30 may be formed of lengths of pipe or may be otherwise formed having an elongated cylindrical shape to fit into recesses 32 and 33 tightly. The exteriors or interiors of the lengths of pipe may be machined or otherwise altered to adapt to recesses 32 and 33 or to increase their interior cross-sectional areas. The top ends of reservoirs 29 and 30 are open to communicate with the interior of chamber 13, and pistons 36 and 37 are provided in the reservoirs. Pistons 36 and 37 may be inserted through the top openings of reservoirs 29 and 30, and said pistons sealingly and slidingly engage the interior walls of said reservoirs. Pistons 36 and 37 have upwardly extending members 38 and 40 and downwardly extending members 39 and 42 of smaller cross-section than the pistons. The pistons, when acted upon by pressure within the valve chambers, force the sealing and lubricating material from the reservoirs through the passages to the grooves in the seat faces. The pistons have grooved elements 87 and sealing elements 88, the functions of which will be explained later.

The seat extensions 17 and 18 have strengthening ribs 101. Guides 102 are provided in the housing at the sides of gate 22. An outlet 103 having threaded plug 104 may be provided in the bottom of lower chamber 14. A gate element 105, which may be any of the conventional types, connects stem 57 to gate 22 for raising and lowering the gate upon rotation of the stem. As shown the stem is non-rising, but it may be a rising stem if desired. Web members 106 may be provided between the block members and the housing to strengthen the construction.

Above each of the reservoirs 29 and 30, a stop is provided to hold the piston within the reservoirs in case a high pressure should be imposed within the reservoir. The stops 44 and 45 are shown formed as elongated cylinders having smaller threaded portions 46 and 47 at one end which screw into correspondingly threaded recesses in protruding bosses 51 and 52 at the underside of bonnet 53. The stops have axially concentric longitudinal openings 54 and 55 into which members 38 and 40 may be freely received when pistons 36 and 37 are near the top openings of reservoirs 29 and 30, respectively. If desired, the stops may be solid bars having no openings 54 and 55, in which case they will be shorter and will terminate somewhat above the tops of the reservoirs.

The valve shown in Figure 1 has a bonnet closure similar to that shown in United States Patent No. 2,660,-191, issued November 24, 1953 to Alexander S. Volpin. The present bonnet closure is, however, somewhat modified from that shown in the patent. Upon chamber 13 is closed at the top by bonnet 53, resilient sealing ring 56, valve stem 57, and back seat bushing 58. A split snap-ring 59 is provided between bonnet 53 and a clamping ring 60. Sealing ring 56 is disposed in groove 62 in the lower flange of bonnet 53 and in groove 63 of upper chamber 13. Snap-ring 59 is disposed in groove 64 near the top of bonnet 53 and in groove 65 provided in clamping ring 60. Bushing 58 is disposed in a downwardly enlarged groove 66 in the lower part of sleeve portion 67 of bonnet 53 and seals around stem 57 which is received axially through sleeve 67 when stem 57 is in the fully raised position corresponding to the position shown in Figure 4 for stem 77 of a different embodiment of the invention. At the upper part of bonnet 53 suitable stuffing boxes (not shown) are provided around stem 57, and a handwheel (not shown) is provided for turning stem 57. These may be as shown in the patent to Volpin 2,660,191, or otherwise as desired.

This invention is not limited to valves of the type shown in Figures 1–3. The invention may be incorporated into valves having conventional bonnet closures as shown in Figure 4. In Figure 4 the reservoirs 29 and 30 are located within an upper valve chamber of a valve having bonnet 71 bolted to the housing 72. Flange members 73 and 74 are adapted to receive a plurality of the bolts 75, as shown. A conventional sealing groove 76 is provided in flanges 73 and 74 to accommodate a ring gasket to seal between the bonnet 71 and housing 72. The valve stem 77 is received by a back seat bushing 78 and suitable packing (not shown) in packing recess 79, and has a handwheel (not shown). Stops 81 and 82 are like stops 44 and 45 except that they are shorter in length, and are received in suitable threaded recesses in block members 83 and 84 of bonnet 71. Pistons 85 and 86, only piston 85 being shown in Figure 4, are identical with pistons 36 and 37 of Figures 1–3, and each piston has a peripherally grooved main element 87, and a flexible sealing element 88, as best shown in Figures 3 and 4. Sealing element 88 is secured to element 87 by bolts 89, as shown. Other types of pistons and other piston seal means may be used.

In case the pressure in a reservoir is higher than the pressure in the interior of the valve, sealing element 88 will act to relieve the excess pressure in the reservoir. The edges of element 88 will be tightly held in contact with the wall of the reservoir whenever the pressure above element 88 is greater than the pressure within the reservoir. However, when the pressure within the reservoir is higher than the pressure in the interior of the valve, the excess reservoir pressure will leak past element 87 and lift the edges of element 88, thereby relieving the pressure in the reservoir. It is because of this feature that the reservoirs need not be capable of withstanding the high pressures under which the valve will operate. When the pressure outside the reservoir is greater than that inside the reservoir, the piston will move to equalize the pressures. On the other hand, when the pressure inside the reservoir is greater than that outside the reservoir, the piston will move upward until it reaches a stop and then the excess pressure remaining will be allowed to escape by the sealing element 88.

Referring now to Figure 5, reservoirs 29 and 30 are filled with sealant by means of injection ports 107 and passages 108 which lead from the injection ports on the back side of the valve body to the apexes of the reservoir cones. These injection ports and passages are similar to those shown in U.S. Patent Number 2,605,078, issued July 29, 1952 to Alexander S. Volpin. Plug means 109 close the ports when sealant is not being injected. The sealant enters a reservoir at the apex of the conical bottom of the reservoir and forces the piston upward within the reservoir until the member 39 or 40 enters a stop and the upward movement of the piston is restrained by the stop.

When a valve in which the reservoirs of the present invention are provided is closed and a higher pressure exists on one side of the gate, one of the reservoirs will supply lubricating and sealing material to the sealing grooves in the seat at the low pressure side. By way of illustration, referring to Figure 1 of the drawings, the valve is closed by gate 22, and a higher pressure exists in fluid passage 11 on the right-hand side of the gate, the upstream side. Chamber 12, including upper chamber 13, will be at the same pressure as the upstream side of passage 11. Gate 22 will be tightly seated at the face of seat 15 and loosely seated at the face of seat 16 because of the higher pressure on the upstream side. The pressure on reservoir 30 will be balanced since the pressure on the upper surface of piston 37 and at groove 28 are the same. At reservoir 29, there is a higher pressure above piston 36 than in grooves 27, and sealing and lubricating material will be forced from reservoir 29 by the piston, through outlet 90, groove 23, and thence by suitable passages such as those shown in United States Patent No. 2,605,078, issued July 29, 1952, to Alexander S. Volpin, and preferably as shown in Volpin's pending application Serial No. 482,288, filed January 17, 1955 now abandoned and entitled "Automatic Sealing Gate Valve," into groove 27 in the face of seat 15. The flow of plastic will continue until the pressure in groove 27 equals the pressure in chamber 13. When the higher pressure is on the left-hand side of the gate, the pressures across reservoir 29 will be balanced and reservoir 30 will supply plastic to groove 28 in the same way. Thus the valve is automatically sealed regardless of which side of the valve is under a higher pressure, and the direction in which the valve is installed in the pipeline is of no concern.

Both the preferred embodiment of the invention in a pressure-sealing bonnet valve, Figures 1–3, and the embodiment in a conventional bolted-bonnet valve, Figure 4, operate in the same way. The only differences between the two embodiments are in the length of the stops above the pistons and the arrangements of the bonnet closures.

An important advantage of the invention results from the conical shape of the bottoms of the reservoirs and the provision of members 39 and 42 on the pistons 36, 37, respectively. When the piston strikes the bottom of the reservoir, member 39 or 42 prevents binding of the piston at that point, since member 39 or 42 will tend to become centered in the cone and will prevent misalignment of the piston in the reservoir.

By locating the reservoirs in the upper part of the valve chamber, the reservoirs may be made larger than is the case when the reservoirs are located in the seats, gates, or lower part of the valve chamber. When the reservoirs are large, as in this invention, they have a large sealant capacity and the operating costs are reduced.

The seats and seat extensions shown also present improvements over the prior art. The extensions are light in weight and are strengthened by rib means 101 at their side away from the gate.

An advantage of the present invention is that sealant is discharged directly downward from a reservoir to the distribution means in the valve. The sealant does not have to flow through tortuous passages from the reservoirs to the valve seat faces. The reservoirs are located close to the valve seats, yet are removably mounted and are readily accessible when the bonnet is removed. In the present invention, valves having a number of different bonnet assemblies may be used without interfering with the reservoirs shown herein. The reservoirs may have other cross-sections than that shown in Figure 2. Since the pistons retain the sealant in the reservoirs, the valves may be installed in any position.

Among the advantages presented by the valves of the present invention is the advantage of ease of construction and fabrication. The reservoir members need not be of heavy construction, and are removable and replaceable. The castings required for manufacture of the valves are simple, since the reservoirs are not made integrally therewith. The reservoirs themselves may be of relatively light construction, there being no large pressure differentials across the walls of the reservoirs.

Since the reservoirs are removable and replaceable, reservoirs of different sizes may be provided for the same valve. In one service it might be desirable to have a larger or smaller reservoir than in another service.

The improvements defined by this invention may be provided in any valve having a rising gate, that is, where there is a chamber offset from the valve flow passage into which the gate is moved to open or to close the valve.

The shape of the reservoirs may be varied to suit the valve design.

The scope of the invention is not to be limited by the embodiments shown and described, but only according to the following claims:

I claim:

1. A gate valve including a body having a flow passage therethrough and a chamber intersecting the flow passage, seat means in said flow passage at opposite sides of said chamber, a reservoir means associated with each said seat means, each said reservoir means comprising a tubular member and a recess in the wall of said chamber adapted to tightly and removably receive the base of the tubular member, and a passage in said body between each said seat means and the reservoir associated therewith, whereby each said tubular member may be removed by movement thereof in a direction axially of the tubular member.

2. In a valve including a body having a flow passage therethrough and a chamber intersecting the flow passage, a sealing material reservoir and sealing system comprising a seat disposed in a recess around the flow passage, a tubular reservoir disposed in said chamber with an end thereof in a recess in said body whereby said reservoir may be removed axially, and port means in said body connecting said reservoir and seat for flow of sealing material therebetween responsive to pressure in said chamber.

3. A gate valve comprising a housing having a gate chamber therein, a pair of aligned flow passages intersecting said gate chamber at opposite sides thereof, a seat recess formed around each said passage at the inner end thereof adjacent said chamber, a seat disposed in each said recess, each said seat having a passage therethrough aligned with said flow passages, a gate means in said chamber slidably movable vertically between said seats between closed and open positions, a reservoir recess formed in the interior of said housing above each of said seat recesses, said reservoir recesses each being of circular form and having their axes vertical and opening upwardly, an elongate tubular reservoir tightly fitted removably at its lower end into each said reservoir recess whereby the said reservoirs are vertically disposed parallel with said gate means movements and laterally of said gate means within said chamber, sealing grooves in each said seat around the inner end of the said seat passage adjacent the gate and around the part thereof received in said seat recess, a port through said housing extending from the bottom of each said reservoir recess to said sealing groove within the seat recess, a port through each seat extending between said sealing grooves thereof, and a supply of flowable sealing material within each said reservoir and reservoir recess, whereby pressures within said chamber will cause said sealing material to flow through said ports and sealing grooves to form fluid tight seals between said gates and seats and between said seats and seat recesses, and whereby said reservoirs may be removed without removing said gate means.

4. The combination of claim 3, including a cylindrical piston slidingly and sealingly disposed in each said reservoir above said supply of sealing material therein, said pistons isolating said sealing material in said reservoirs and reservoir recesses from fluids in said valve chamber, pressures in said valve chamber acting to move said pistons downwardly in said reservoirs to force said sealing material to flow therefrom through said ports to said sealing grooves.

References Cited in the file of this patent

UNITED STATES PATENTS

| | | |
|---|---|---|
| 1,980,768 | Specht | Nov. 13, 1934 |
| 2,317,657 | Volpin | Apr. 27, 1943 |
| 2,591,031 | Volpin | Apr. 1, 1952 |
| 2,653,789 | Eichenberg | Sept. 29, 1953 |
| 2,660,397 | Volpin | Nov. 24, 1953 |
| 2,663,540 | Erickson | Dec. 22, 1953 |